United States Patent
Bernier et al.

(10) Patent No.: US 7,389,043 B2
(45) Date of Patent: Jun. 17, 2008

(54) PROTECTION ARCHITECTURE FOR PHOTONIC SWITCH USING TUNABLE OPTICAL FILTER

(75) Inventors: Eric Bernier, Nepean (CA); Dominic Goodwill, Kanata (CA); Mirjana Vukovic, Nepean (CA)

(73) Assignee: Nortel Networks Limited, St. Laurent, Quebec (CA)

(*) Notice: Subject to any disclaimer, the term of this patent is extended or adjusted under 35 U.S.C. 154(b) by 713 days.

(21) Appl. No.: 10/697,312

(22) Filed: Oct. 31, 2003

(65) Prior Publication Data
US 2005/0094998 A1 May 5, 2005

(51) Int. Cl.
*H04J 14/02* (2006.01)
(52) U.S. Cl. .................... 398/7; 398/68; 398/48
(58) Field of Classification Search .......... 398/7, 398/38, 34, 68, 69, 48–51

See application file for complete search history.

(56) References Cited

U.S. PATENT DOCUMENTS

| | | | |
|---|---|---|---|
| 7,146,102 B2 * | 12/2006 | Nishi et al. | 398/45 |
| 7,221,429 B1 * | 5/2007 | Cavanaugh et al. | 349/198 |
| 2002/0044322 A1 * | 4/2002 | Blumenthal et al. | 359/161 |
| 2003/0007722 A1 * | 1/2003 | Caroli et al. | 385/24 |
| 2003/0185566 A1 * | 10/2003 | Nishi et al. | 398/56 |

* cited by examiner

*Primary Examiner*—Leslie Pascal

(57) ABSTRACT

A method and a protection switching arrangement for protection switching of any one of a plurality of optical signals of a multi-wavelength optical signal from the failure of an optical component is provided. The multi-wavelength optical signal which contains the optical signals is itself rerouted by the use of wavelength agnostic rerouting elements, after which a tunable optical filter is used to obtain from the multi-wavelength optical signal the particular optical signal which would have been affected by the failure. In embodiments of the invention where the failed component is a switching fabric, the multi-wavelength optical signal is rerouted away from the failed switching fabric through a redundant switching fabric after which the particular optical signal is obtained with use of the tunable optical filter.

14 Claims, 7 Drawing Sheets

PROTECTION ARCHITECTURE FOR PHOTONIC SWITCH USING TUNABLE OPTICAL FILTER

CROSS-REFERENCE TO RELATED APPLICATIONS

The present application is related in subject matter to co-pending U.S. application Ser. No. 09/726,027, entitled "Protection Switching Arrangement for an Optical Switching System", filed on Nov. 30, 2000, assigned to the Assignee of the present invention and hereby incorporated by reference herein in its entirety.

FIELD OF THE INVENTION

The invention relates generally to systems for switching optical signals and more particularly to protection switching and protection switching arrangements for such systems.

BACKGROUND OF THE INVENTION

The facilitation of optical protection is an important aspect in any optical network. If protection is not provided, optical signals and the data they carry can be vulnerable to subsystem failure, component failure, or otherwise any breakdown of the physical path traversed by the optical signals. Loss of data and degradation of service are just some of the problems associated with these types of failures. In order to provide some protection in the event of a failure, optical protection in the form of optical protection switching to reroute optical signals around a failed optical physical path may be employed.

As with any part of the optical network, optical protection is an important part of an optical switching system, and more so as WDM (Wavelength Division Multiplexed) systems utilize increasingly larger numbers of optical channels. Due to the multichannel nature of the components within the network, the failure of a single component has the potential to effect a large number of different channels at the same time.

A typical photonic-switched wavelength-grooming network node consists of a set of photonic line cards and a set of photonic switching fabric cards. Photonic switching fabric cards often comprise an array of 2D or 3D MEMS (Micro-Electro Mechanical Systems) optical switches that perform the optical switching of the node. MEMS optical switches are most commonly derived from micro-mirror technology but may be derived from liquid crystal technology, liquid drop technology, bubble technology, or any one of a number of other optical signal redirecting technologies. Due to the possibility of switching element misalignment or switching element failure within a MEMS switching fabric, to protect the system against failure, a mechanism for re-routing optical signals from the normal switching fabric to a redundant switching fabric has been developed.

Co-pending U.S. application Ser. No. 09/726,027 describes such a protection switching system in which a MEMS micro-mirror photonic switch chip provides protection of photonic switch fabric cards by rerouting optical signals to a redundant switch fabric.

Generally, there are at least two distinct types of photonic line cards for use with a photonic node, a trunk type and a tributary type.

A photonic trunk line card has an ingress side, into which light of multiple wavelengths comes from the network fiber, passes through an optical amplifier, is demultiplexed and each wavelength sent to a respective photonic switching fabric card. Variable optical attenuators (VOAs), optical taps, optical monitors and optical supervisory channel (OSC) functions are added as required. Similar and complementary functions (typically including multiplexing) are present on the egress side of each photonic trunk line card, from which the light exits and proceeds into the network fiber. It should be noted that there are many ways in which a photonic trunk line card may be partitioned so that it is capable of servicing one or more network fibers each carrying one or more wavelengths. As is proposed in U.S. application Ser. No. 09/726,027, photonic switches built using MEMS arrays are utilized in the trunk cards to provide a redundant optical path to a redundant switch fabric card, so that in the event that an initially designated switch card of the system fails and needs to be protected, the protection module of the trunk card (via MEMS based switches) provides the redundant optical path to a redundant switch fabric card.

A photonic tributary line card is similar to a photonic trunk line card, except that it handles several network fibers, with each network fiber carrying only one single wavelength channel optical signal, and hence no demultiplexing or multiplexing function is required. For the purposes of this document a single channel optical signal centered on a wavelength $\lambda$ is denoted by the center wavelength $\lambda$. Each optical signal, before it is sent to a photonic switch fabric card, may pass through a protection switch as described, for example, in Co-pending U.S. application Ser. No. 09/726,027, and can be rerouted to a redundant photonic switch card if required.

A switching arrangement generally can include diverse assortments of ingress cards (ingress trunk line cards and ingress tributary cards) on the ingress side of a switching fabric and diverse assortments of egress cards (egress trunk line cards and egress tributary cards) on the egress side of the switching fabric, in which optical signals may be switched from any ingress card to any egress card as required.

SUMMARY OF THE INVENTION

The present invention provides for a method and a protection switching arrangement for protection switching of any one of a plurality of optical signals of a multi-wavelength optical signal from the failure of an optical component. The multi-wavelength optical signal which contains the plurality of optical signals is itself rerouted by the use of wavelength agnostic rerouting elements (elements which affect optical signals of different wavelengths in the same manner), after which a tunable optical filter is used to obtain from the multi-wavelength optical signal a particular optical signal which would have been affected by the failure. In some embodiments the multi-wavelength optical signal is first split into two portions, a protection portion of which is rerouted and filtered to obtain a protection portion of the particular optical signal. In some embodiments, a stray optical signal directed over an incorrect waveguide on an egress card or to an incorrect egress card, is blocked using an optical blocker.

In embodiments of the invention where the failed component is a switching fabric, the multi-wavelength optical signal is rerouted away from the failed switching fabric through a redundant switching fabric after which the particular optical signal is obtained with use of the tunable optical filter. This particular optical signal may then be recombined with a second multi-wavelength optical signal.

For an optical signal of a plurality of separate optical signals, protection is provided by first multiplexing the plurality of optical signals into a multi-wavelength optical signal which is then rerouted and filtered as described above. After the particular optical signal is obtained it may be rerouted along an optical pathway over which the original particular optical signal would have traveled but for the failure.

Some embodiments of the invention employ a tunable optical filter to ensure no erroneous or invalid optical signals from a protection pathway are transmitted to an optical communication system.

Other aspects and features of the present invention will become apparent to those of ordinary skill in the art upon review of the following description of specific embodiments of the invention in conjunction with the accompanying figures.

BRIEF DESCRIPTION OF THE DRAWINGS

Preferred embodiments of the invention will now be described with reference to the accompanying diagrams, in which.

DETAILED DESCRIPTION OF THE PREFERRED EMBODIMENTS

It is to be understood that in general a protection switching arrangement may comprise a diverse assortment of ingress cards and egress cards. Each of the following detailed descriptions of the various embodiments depicted in the Figures are not to be misunderstood as limiting a protection arrangement to only the types of cards depicted therein. Each of the following descriptions should be understood as illustrating a pair of ingress and egress cards according to the invention between which a specific failure has occurred, and for which a specific type of protection switching is performed. Various combinations of the ingress and egress cards according to the embodiments described hereinafter, and hence various combinations of types of protection switching, may be employed in a protection switching arrangement contemplated by the invention.

Figure 7:
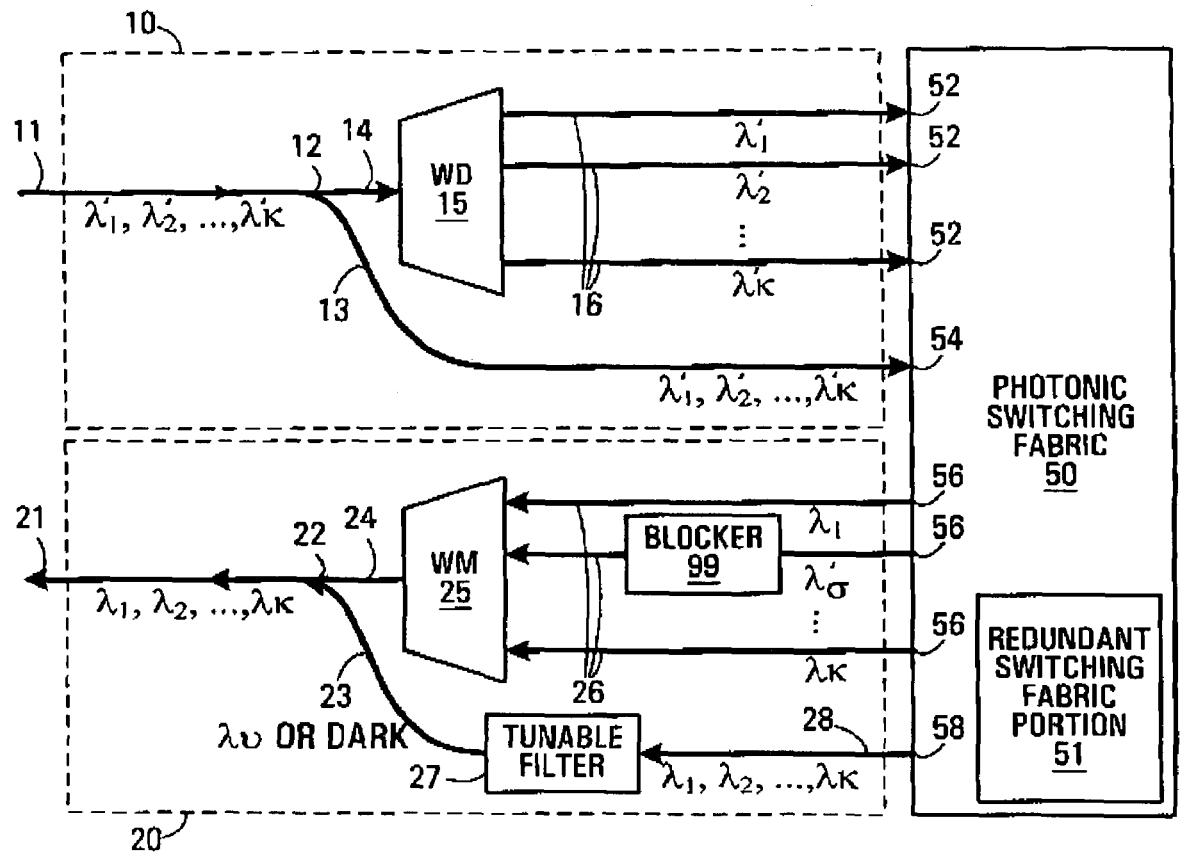
FIG. 7 is a schematic block diagram of protection switching according to a trunk line card to trunk line card embodiment of the invention utilizing a protective optical blocker.

FIGS. 1 through 5 depict embodiments in which protection switching of an optical signal to be protected is performed. FIG. 7 illustrates an embodiment which also performs blocking of a stray optical signal. It should be understood that although the embodiments described in association with FIGS. 1 through 5 are directed towards the protection of an optical signal in the context of a failure which typically results in the absence of the optical signal at the egress card it should have been switched to, it is possible that concurrently, the optical signal is actually switched to a second egress card it should not have been switched to. The embodiment depicted in FIG. 7 provides an egress card having an optical blocker to protect the optical communications system from stray optical signals which have been incorrectly switched to the egress card. Although FIG. 7 depicts a specific example embodiment similar to that depicted in FIG. 1 with the addition of an optical blocker, it should be understood that each of the embodiments depicted in FIGS. 2 through 5 may also utilize an optical blocker as described in association with FIG. 7.

Figure 1:
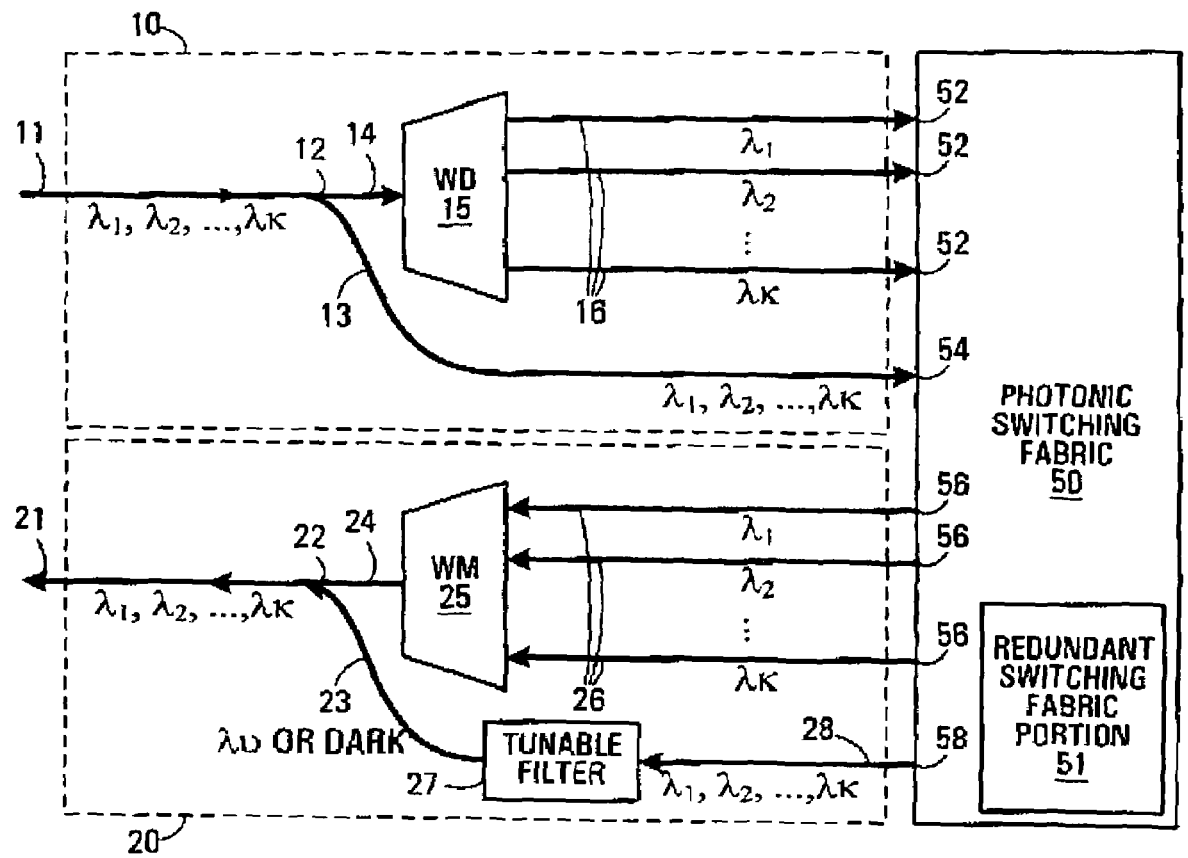
FIG. 1 is a schematic block diagram of protection switching according to a trunk card to trunk card embodiment of the invention.

Referring to FIG. 1, a protection switching arrangement according to a trunk card to trunk card embodiment of the invention is described. An ingress trunk line card 10 is coupled to the ingress side of a photonic switching fabric 50 which in turn is coupled on its egress side to an egress trunk line card 20. The embodiment depicted in FIG. 1 utilizes a splitter, a tunable optical filter, and a combiner to perform signal redirection when switching fabric failure occurs, rather than utilizing optical switches.

The embodiment of FIG. 1 will first be described in terms of its structure. An input of the ingress trunk line card 10 is coupled to an ingress optical fiber 11. Optically coupled to the input of the ingress trunk line card 10 is an input port of an optical splitter 12. An in-service output port of the optical splitter 12 is coupled by an ingress optical waveguide 14 to a wavelength demultiplexer (WD) 15. A protection output port of the optical splitter 12 is optically coupled by a protection optical waveguide 13 to a redundant input 54 of the photonic switching fabric 50. A plurality of outputs of the WD 15 are coupled by a plurality of ingress in-service optical waveguides 16 to a respective plurality of in-service inputs 52 of the photonic switching fabric 50.

The in-service inputs 52 of the photonic switching ihbric 50 are coupled by an in-service switching fabric portion (not shown) of the photonic switching fabric 50 to a plurality of switched in-service outputs 56 of the pbotonic switching fabric 50. The redundant input 54 of the photonic switching fabric 50 is coupled by a redundant switching fabric portion (51) of the photonic switching fabric 50 to a switched redundant output 58 of the photonic switching fabric 50.

The plurality of switched in-service outputs 56 of the photonic switching fabric 50 are coupled by a plurality of egress in-service waveguides 26 to respective inputs of a wavelength multiplexer (WM) 25 of the egress trunk line card 20. An output of the WM 25 is coupled by an egress optical waveguide 24 to an in-service input port of an optical combiner 22. The switched redundant output 58 of the photonic switching fabric 50 is coupled by a switched protection optical waveguide 28 to an input of a tunable optical filter 27. The tunable optical filter is preferably deterministic, having a known voltage, current or temperature versus wavelength characteristic although non-deterministic tunable optical filters could also be used which preferably include dynamic measurement of the wavelength characteristic. An output of the tunable optical filter 27 is coupled by a post-filter optical waveguide 23 to a protection input port of the optical combiner 22. An output port of the optical combiner 22 is coupled through an output of the egress trunk line card 20 to an egress optical fiber 21.

The photonic switching fabric 50 may be comprised of a number of separate switching fabrics, for example dedicated switching fabrics to provide in-service optical pathways and spare switching fabrics to provide protection optical pathways, or it may be a single integrated switching fabric.

As described hereinbefore, it should be noted that although each of the Figures depicts a single ingress card and a single egress card as part of a switching arrangement, typically switching is performed between one or more ingress cards and one or more egress cards so that optical signals are switched by the switching fabric to and from various ingress and egress optical fibers as required. A switching arrangement according to the invention can have a number of different types of ingress and egress cards, and it should be understood that each Figure illustrates a specific protection path due to a failure which affects the optical signals of specific cards illustrated therein. As such in FIG. 1, the ingress trunk line card 10 is to be understood as being one of possibly more than one ingress card, and the egress trunk line card 20 is to be understood as being one of possibly more than one egress card. Accordingly, it is to be understood that multiple in-service inputs 52, redundant inputs 54, switched in-service outputs 56, and switched redundant outputs 58 are provided on the photonic switching fabric 50 to service multiple ingress and egress cards, although only one set of inputs and one set of outputs are shown in FIG. 1. Moreover, it should be understood that in an optical cross-connect arrangement, single channel optical signals input in one WDM optical signal can be output in a different WDM optical signal, and in general the single channel optical signals of a multi-channel optical signal do not need to stay together, and are switched in the switching fabric more or less independently and re-multiplexed as required.

The embodiment of FIG. 1 will now be described in terms of its function. The ingress trunk line card 10 and the egress trunk line card 20 are adapted to perform protection switching in cooperation with the photonic switching fabric 50 which performs switching of in-service optical signals, and in the event of failure, redundant path switching for protected optical signals. The protection switching arrangement of FIG. 1 and the arrangements depicted in the remaining figures may operate in either a service mode or a protection mode. In the arrangement depicted in FIG. 1 and also in each of the remaining protection switching arrangements, when no failure has been detected and no protection switching is required, the protection switching arrangement operates in service mode, whereas when a failure has occurred in the photonic switching fabric, the protection switching arrangement operates in protection mode to redirect around the failure an optical signal which would have been affected by the failure.

During operation in either mode, the ingress trunk line card 10 is input with a multi-wavelength optical signal comprising a plurality of single channel optical signals $\lambda_1, \lambda_2, \ldots, \lambda_K$ propagating along ingress optical fiber 11. Typically the multi-wavelength optical signal is a WDM (Wavelength Division Multiplexed) aggregate which could be a DWDM (Dense Wavelength Division Multiplexed), a CWDM (Coarse Wavelength Division Multiplexed) or an SWDM (Sparse Wavelength Division Multiplexed) aggregate. The splitter 12 shown in FIG. 1 is a power splitter, outputting an in-service portion of the optical signal entering its input port through its in-service output port along the ingress optical waveguide 14, and outputting a protection portion of the optical signal through its protection output port along the protection optical waveguide 13. The splitting ratio between the power of the in-service portion of the optical signal and the protection portion of the optical signal is not limited to a ratio of 50:50. The splitting ratio may be set in accordance with the optical properties of the arrangement and in particular, may be chosen to compensate for the losses through the photonic switching fabric 50 and the tunable optical filter 27, and for the combining ratio of the optical combiner 22 in order to obtain desired behavior of the optical signals traversing the arrangement.

The optical splitter 12 is wavelength agnostic in the relevant wavelength range spanned by the multi-wavelength optical signal. An optical splitter which is wavelength agnostic exhibits the same splitting ratio for any optical signal of a wavelength within the relevant wavelength range. Referring to FIG. 1, all of the wavelengths of the multi-wavelength optical signal ($\lambda_1, \lambda_2, \ldots, \lambda_K$) entering the input port are split according to the same splitting ratio between the in-service output port and the protection output port.

The in-service portion of the multi-wavelength optical signal traverses the ingress optical waveguide 14 and is demultiplexed by the wavelength demultiplexer 15 into a plurality of demultiplexed single channel optical signals $\lambda_1, \lambda_2, \ldots, \lambda_K$ each single channel optical signal emerging along a respective ingress in-service optical waveguide 16. Each single channel optical signal is input into a respective in-service input 52 of the photonic switching fabric 50. The photonic switching fabric 50 switches each of the single channel optical signals $\lambda_1, \lambda_2, \ldots, \lambda_K$ to a respective appropriate switched in-service output 56 to propagate along egress in-service optical waveguides 26 as switched in-service optical signals. As outlined above, the switched in-service optical signals traversing the egress in-service optical waveguides 26 of any particular egress trunk line card 20 may originate from different multi-wavelength optical signals and hence different ingress trunk line cards 10 or in general may be separate single channel optical signals input over different ingress tributary cards. As such the designation $\lambda_1, \lambda_2, \ldots, \lambda_K$ shown on the in-service optical waveguides 26 in the egress trunk line card 20 specifies the center wavelengths of the single channel optical signals which have been switched to the particular egress trunk line card 20, and do not indicate that the switched in-service optical signals themselves are necessarily the same as those which traversed the specific ingress trunk line card 10.

The switched in-service optical signals are multiplexed in the WM 25 into a multi-wavelength optical signal, typically a WDM aggregate, and output along the egress optical waveguide 24, through the optical combiner 22, through the output of the egress trunk line card 20, and out along the egress optical fiber 21.

The protection portion of the multi-wavelength optical signal comprising the single channel optical signals $\lambda_1, \lambda_2, \ldots, \lambda_K$ emerges from the protection output port of the splitter 12, traverses the protection optical waveguide 13 and enters the photonic switching fabric 50 at the redundant input 54. The protection portion of the multi-wavelength optical signal traverses the redundant portion of the photonic switching fabric 50, and is switched to an appropriate switched redundant output 58 of the photonic switching fabric 50. In the absence of a failure the protection portion of the multi-wavelength optical signal may be rerouted to any egress card where it is filtered out completely by a tunable filter 27, or alternatively it may simply be dropped until a failure has been detected and protection mode is commenced.

During operation in service mode, the in-service switching portion of the photonic switching fabric 50 is fully operational in the sense that each demultiplexed single channel optical signal $\lambda_1, \lambda_2, \ldots, \lambda_K$ input from a respective ingress in-service optical waveguide 16 may be switched as required to appropriate in-service outputs 56 of the photonic switching fabric 50. In service mode, the photonic switching fabric 50 of the embodiment of FIG. 1 switches optical signals in the same manner as would a standard switching fabric which does not have any redundant inputs, redundant outputs or redundant optical pathways, and does not otherwise have any protection mechanism.

While the protection switching arrangement is in service mode, the tunable optical filter 27 is tuned so that no optical signal emerges at its output along the post-filter optical waveguide 23 this being indicated in FIG. 1 by the designation "DARK". Alternatively, as noted above, the protection switching arrangement may utilize the photonic switching fabric 50 itself to redirect a multi-wavelength optical signal input over a redundant input 54 to a dropped output (not shown) of the photonic switching fabric 50.

The arrangement operates in protection mode after a failure in the in-service portion of the photonic switching fabric 50. The failure could occur, for example, in a switching element or optical path in the in-service switching portion of the photonic switching fabric 50. The particular single channel optical signal of the plurality of single channel optical signals $\lambda_1, \lambda_2, \ldots, \lambda_K$ which requires rerouting is denoted $\lambda_v$ and is referred to as the protected single channel optical signal. The identity of the protected single channel optical signal $\lambda_v$ which requires rerouting due to the failure determines the particular egress card and hence the particular switched redundant output 58 to which the protection portion of the multi-wavelength optical signal which contains the protected single channel optical signal $\lambda_v$ is switched. It is to be understood that the egress trunk line card 20 depicted in FIG. 1 is precisely the egress card to which the in-service portion of the protected single channel optical signal $\lambda_v$ would have been switched if there were no failure.

The protection portion of the multi-wavelength optical signal containing the protected single channel optical signal $\lambda_v$ is switched through the respective switched redundant output 58 of the photonic switching fabric 50 to the egress trunk line card 20. The photonic switching fabric 50 in this and all of the embodiments described herein, is wavelength agnostic in that it is capable of switching multiple optical signals travelling together in the same manner independent of the wavelengths of the optical signals. The protection portion has the all of the single channel optical signals $(, A_2, \ldots, \lambda_K)$ which accompanied the protected single channel optical signal $\lambda_v$ when it was split by the splitter 12 of the ingress trunk line card 10. Although these signals have the same center wavelengths as the in-service single channel optical signals $(\lambda_1, \lambda_2, \ldots, \lambda_K$ except for $\lambda_v)$ which emerge along egress in-service optical waveguides 26, these signals do not need to be the same, and in a cross connect they often would not be. In any case, all of the superfluous signals in the protection portion (all those except for $\lambda_v$) are filtered out as described below, and hence only the protected single optical channel signal $\lambda_v$ of the protection portion is multiplexed, as it should, in the specific egress trunk line card 20.

The protection portion of a multi-wavelength optical signal containing the protected single channel optical signal $\lambda_v$ after emerging from switched redundant output 58 then propagates along switched protection optical waveguide 28 to the input of the tunable optical filter 27. Since all of the optical signals in the multi-wavelength optical signal except for $\lambda_v$ are invalid and would interfere with the correct optical signals of similar respective wavelengths traversing the egress in-service optical waveguides, the tunable optical filter 27 is tuned so that no optical signal emerges at its output except for the single channel optical signal $\lambda_v$. The filter 27 is tuned also such that it absorbs all other optical signals to avoid back reflection in the optical system. To ensure that no stray optical signals are transmitted through the tunable optical filter 27 while it is being tuned to the wavelength of the single channel optical signal $\lambda_v$, in this and all the remaining embodiments, the photonic switching fabric 50 does not switch the single channel optical signal $\lambda_v$ to the switched redundant output until the tunable optical filter has been tuned to the wavelength $\lambda_v$ of the protected single channel optical signal.

It should be understood that detection of a failure in a photonic switching fabric and protection switching may be performed using any one of a number of known techniques, some of which are employed in the embodiments of co-pending U.S. application Ser. No. 09/726,027 published May 30, 2002. One example technique, described here for the purposes of illustration only and which is not shown in the Figures, involves the provision of optical power taps at the output ports of the photonic switching fabric 50. The power taps are monitored by photodetectors which are coupled to a switching controller. The switching controller would then monitor the signals from the photodetectors and correlate these signals with the expected measurements that would be made if the switching fabric were working properly. Alternatively, some photonic switching fabrics include a self-diagnosing capability which could be used to provide information directly to the switching controller without the use of external taps and photodetectors. In the case of a failure an optical signal interruption would be reflected in an unexpectedly weaker or absent signal from a photodetector (or alternatively by a failure indication from the self-diagnosis of the switching fabric itself) indicating that the optical signal was not properly switched. Sometimes failure can cause a stray optical signal to emerge from the photonic switching fabric at the wrong output or over an incorrect egress card. The switching controller could then in a similar manner as in the embodiments of co-pending U.S. application Ser. No. 09/726,027, coordinate the switching in the ingress and egress cards (if any) and the switching through the redundant switching fabric of the protected optical signal $\lambda_v$.

It should be understood that, although not shown in the figures, a switching controller or equivalent component or components along with taps and photodetectors (or alternatively the self-diagnosing capability of the photonic switching fabric), performs failure detection and coordinates the control of the photonic switching fabric 50 and any optical selector switch (OSS) to perform protection switching. In the embodiments described herein, this switching controller or other component or components, having an identification of the wavelength of the protected optical signal being switched through the redundant portion of the photonic switching fabric, tunably controls the tunable optical filter for proper filtering out of all optical signals except for the protected optical signal $\lambda_v$.

Whether the failure originates from a faulty switching element, a problem with the optical path, or any other problem in the in-service portion of the photonic switching fabric 50, typically the single channel optical signal $\lambda_v$ does not emerge from any of the in-service outputs 56 of the photonic switching fabric 50, and preferably in protection mode, the photonic switching fabric 50 ensures that no optical signal is output along the egress in-service optical waveguide 26 over which the single channel optical signal $\lambda_v$ would have propagated had there been no failure.

Alternatively, instead of a failure causing a loss of signal, a failure may cause an unwanted signal to emerge from an incorrect egress in-service output 56. This erroneous or stray optical signal ideally is blocked to prevent signal contamination of the network downstream. The embodiment described hereinbelow in association with FIG. 7 discusses such a protection switching arrangement.

In protection mode, each of the in-service portions of the single channel optical signals $(\lambda_1, \lambda_2, \ldots, \lambda_K$ except for $\lambda_v)$ which have been switched by the in-service switching portion of the photonic switching fabric 50 to the egress trunk line card 20 of FIG. 1 emerge through switched in-service outputs 56 in the same manner as when the arrangement is in service mode. The single channel optical signals propagate along egress in-service optical waveguides 26 and enter WM 25 where they are multiplexed and emerge as a second multi-wavelength optical signal, which in this case comprises each of the single channel optical signals $\lambda_1, \lambda_2, \ldots, \lambda_K$ except for $\lambda_v$. The second multi-wavelength optical signal propagates along the egress optical waveguide 24 towards the in-service input port of the optical combiner 22.

The single channel optical signal $\lambda_v$ emerges from the output of the tunable optical filter 27 and propagates along the post-filter optical waveguide 23 to the protection input port of the optical combiner 22 where it is combined with the second multi-wavelength optical signal. The optical combiner is a power combiner, outputting a combined optical signal which is a combination of the powers of the signals entering its in-service input port from the egress optical waveguide 24 and optical signals entering its protection input port from the post-filter optical waveguide 23. The combining ratio in the combined output between the power of the optical signals entering the in-service input port and the protection input port may be set in accordance with the optical properties of the arrangement and in particular, may be chosen to compensate for the losses through the photonic switching fabric 50 and the tunable optical filter 27, and for the splitting ratio of the optical splitter 12 in order to obtain desired behavior of the optical signals traversing the arrangement. The optical combiner 22 is wavelength agnostic so that all of the different wavelengths entering the inputs are combined according to the same combining ratio. The resulting combined multi-wavelength optical signal is a combination of an optical signal having single optical channels $\lambda_1, \lambda_2, \ldots, \lambda_K$, except for $\lambda_v$, and the single channel optical signal $\lambda_v$, and hence comprises a plurality of single channel optical signals $\lambda_1, \lambda_2, \ldots, \lambda_K$. The combined multi-wavelength optical signal output from the output of the optical combiner is output through the output of the egress trunk line card 20 and over the egress optical fiber 21.

The embodiment illustrates how optical signal redirection can occur without the use of optical switches to perform protection switching. The utilization of a splitter-combiner plus tunable filter design simplifies the protection architecture for optical protection of a photonic cross-connect system. The design also may provide a cost advantage by avoiding the use of costly selector switches. Avoiding the use of switches also may improve reliability by reducing the number of active components which may fail, and facilitating more straightforward equalization between the optical powers of the optical signal to be protected and the optical signals which are not.

When the arrangement operates in service mode, the second multi-wavelength optical signal which emerges along the egress optical fiber 21, is only comprised of the in-service portions of optical signals split by splitters 12 of various ingress trunk line cards 10. When the arrangement operates in protection mode, the combined optical signal which emerges along the egress optical fiber 21, is only comprised of the in-service portion of single channel optical signals $\lambda_1, \lambda_2, \ldots, \lambda_K$ except for $\lambda_v$ and a filtered version of a protection portion of the single channel optical signal $\lambda_v$. As such optical power through the arrangement is inevitably lost, and the total optical power of the second multi-wavelength optical signal or the combined multi-wavelength optical signal will not be as great as the power of the original multi-wavelength optical signal. The loss incurred using the splitter-combiner and filter design, however, is comparable to that incurred using a switching system to redirect optical signals. In the case described above where one splitter and one combiner is used to protect a single optical signal, i.e. the N+1 protection scheme, the loss incurred in the splitter, combiner, and filter would be equivalent to that incurred by the use of two switches to perform the redirection.

The splitting and combining ratios can be adjusted to calibrate the loss in the wavelength specific path and the protection path to simplify the link engineering. For example, in systems where the protected optical signal is redirected by an optical switch, equalizing losses between the optical signals that traverse in service paths and those that traverse the protection path is more involved since each optical signal, when redirected, may encounter a different optical path length, efficiency, and loss through the MEMS array. In the embodiment depicted in FIG. 1, each of the single channel optical signals of the multi-wavelength optical signal traverses the same protection path, and hence encounters the same losses, efficiencies and path length from the splitter 12 to the combiner 22. As such, the equalization between the protected single channel optical signal and those which emerge over switched in service outputs 56 (effected by for example the splitting ratio of the splitter 12 and the combining ratio of the combiner 22) does not need to be varied depending upon the wavelength of the single channel optical signal to be protected.

It should be noted that although the embodiment has been depicted in the context of an N+1 protection scheme, in an N+x (x>1) scheme, more than one optical signal may be protected by the provision of more splitters (or a splitter with more output ports), additional redundant optical pathways, more filters, and more combiners (or a combiner with more input ports). For example in an N+2 protection scheme, a 1×3 splitter instead of the 1×2 splitter could be employed. In such a case, two of the outputs of the splitter would be protection outputs for redirecting a portion of all of the signals through a separate redundant optical pathway. In the case of two failures in the switching fabric, the two optical signals to be protected would be directed through a respective redundant optical pathway through a respective tunable filter which would filter out all optical signals except for the respective optical signal to be protected. Each of the two respective optical signals would then be input over a respective input port of a 3×1 combiner to be combined with each other and a second multi-wavelength optical signal.

It should be noted that although the Figures show the ingress and egress side of the photonic switching fabric 50 to be on the same side of the schematic block used to represent the photonic switching fabric 50, the physical location of the inputs and outputs of the actual photonic switching fabric 50 need not necessarily correspond to the location of the same depicted in relation to the representation.

Figure 2:
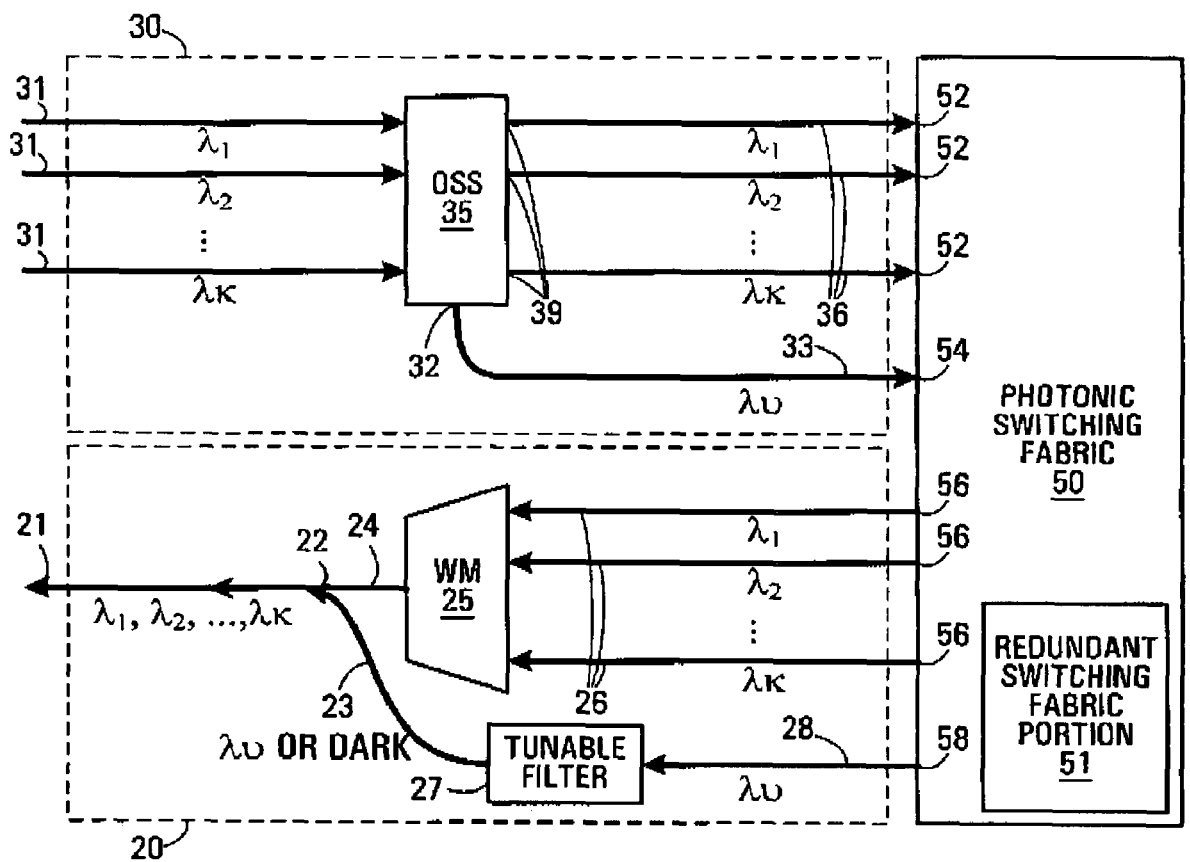
FIG. 2 is a schematic block diagram of protection switching according to a tributary card to trunk card embodiment of the invention.

Referring to FIG. 2, a protection switching arrangement according to a tributary card to trunk card embodiment of the invention is described. An ingress tributary card 30 is coupled to the ingress side of a photonic switching fabric 50 which in turn is coupled on its egress side to an egress trunk line card 20. Each numeral indicates the same type of element when used in each of the Figures. As such all of the elements of the egress trunk line card 20 and the elements of the photonic switching fabric 50 of FIG. 2 correspond respectively to the elements of the egress trunk line card 20 and the elements of the photonic switching fabric 50 of FIG. 1. The embodiment depicted in FIG. 2 utilizes an optical selector switch, a tunable optical filter, and a combiner to perform signal redirection when switching fabric failure occurs.

The embodiment of FIG. 2 will first be described in terms of its structure. A plurality of inputs of the ingress tributary card 30 are coupled to a plurality of ingress optical fibers 31. Optically coupled to the inputs of the ingress tributary card 30 are a plurality of input ports of an optical selector switch (OSS) 35. A plurality of in-service OSS output ports 39 of the OSS 35 are coupled by a plurality of ingress in-service optical waveguides 36 respectively to the plurality of in-service inputs 52 of the photonic switching fabric 50. A protection OSS output port 32 of the OSS 35 is optically coupled by a protection optical waveguide 33 to the redundant input 54 of the photonic switching fabric 50.

The structure and interconnection of the photonic switching fabric 50 and the egress trunk line card 20 of FIG. 2 are the same as the structure and interconnection of respectively the photonic switching fabric 50 and the egress trunk line card 20 of FIG. 1.

As described in association with FIG. 1, switching is typically performed between one or more ingress cards and one or more egress cards, and accordingly the ingress tributary card 30 of FIG. 2 is only one of possibly more than one ingress card.

The embodiment of FIG. 2 will now be described in terms of its function. In a similar manner to that of the embodiment of FIG. 1, the ingress tributary card 30 and the egress trunk line card 20 of FIG. 2 are adapted to perform protection switching in cooperation with the photonic switching fabric 50 which performs switching of in-service optical signals, and in the event of failure, performs redundant path switching for protected optical signals. As with the embodiment described in association with FIG. 1, the arrangement may operate in a service or a protection mode.

During operation in either mode, the ingress tributary card 30 is input with a plurality of single channel optical signals $\lambda_1$, $\lambda_2, \ldots, \lambda_K$ propagating along ingress optical fibers 31, each ingress optical fiber having a respective single channel optical signal propagating therethrough. Typically these single channel optical signals are individual signals having wavelengths corresponding to wavelengths of a WDM aggregate.

The OSS 35 shown in FIG. 2 is arranged so that when it is in service mode it switches each single channel optical signal $\lambda_1, \lambda_2, \ldots, \lambda_K$ to one of its in-service OSS output ports 39. The OSS of this and any of the embodiments described herein, is wavelength agnostic in that it is capable of switching an optical signal in a manner independent of the wavelength of the optical signal. In a preferred embodiment the OSS 35 is arranged to allow the single channel optical signals $\lambda_1$, $\lambda_2, \ldots, \lambda_K$ to pass straight through the OSS 35 and out in-service OSS output ports 39 without any optical switching. Emerging along each ingress in-service optical waveguide 36 is a respective in-service single channel optical signal. Each single channel optical signal is input into an in-service input 52 of the photonic switching fabric 50.

During operation in service mode, the photonic switching fabric 50 and the egress trunk line card 20 of FIG. 2 operate in the same manner as described in association with FIG. 1. The tunable optical filter 27 is tuned so that no optical signal emerges at its output even if one were erroneously input along the switched protection optical waveguide 28. Alternatively, the protection switching arrangement may utilize the photonic switching fabric 50 itself to redirect an erroneous optical signal to a dropped output (not shown) of the photonic switching fabric 50.

The OSS 35 is arranged so that in protection mode it switches one of the plurality of single channel optical signals $\lambda_1, \lambda_2, \ldots, \lambda_K$ denoted $\lambda_v$, to its protection OSS output port 32. The particular single channel optical signal $\lambda_v$ switched is the protected single channel optical signal $\lambda_v$ which would be affected by a failure in the in-service switching fabric portion of the photonic switching fabric 50. When the OSS 35 is operating correctly in protection mode, no portion of the protected single channel optical signal $\lambda_v$ will be output along any of the in-service OSS output ports 39.

The protected single channel optical signal $\lambda_v$ traverses the protection optical waveguide 33 and enters the photonic switching fabric 50 at the redundant input 54. The protected single channel optical signal $\lambda_v$ traverses the redundant portion of the photonic switching fabric 50, and is switched to the switched redundant output 58. As was the case with the embodiment depicted in FIG. 1, the egress trunk line card 20 shown in FIG. 2 is precisely the egress trunk line card to which the protected channel optical signal $\lambda_v$ would have been switched had there been no failure. The protected single channel optical signal $\lambda_v$ propagates along switched protection optical waveguide 28 to the input of the tunable optical filter 27.

It should be noted that the OSS 35 can perform redirection of single optical channel signals therethrough without splitting the signals into two portions. As such more optical power for each optical signal output from the OSS 35 may be maintained. As a consequence, the photonic switching fabric 50 can be used to switch single channel optical signals which have passed through OSS's to egress trunk line cards which are not input with optical signals which have passed through splitters and vice versa.

The embodiment illustrates how optical signal redirection can occur without the use of optical switches on the egress side to perform protection switching. The utilization of an OSS and combiner plus tunable filter design simplifies the protection architecture for optical protection of a photonic cross-connect system. The design also may provide a cost advantage by avoiding the use of a costly selector switch on the egress side. Avoiding the use of the switch also may improve reliability by reducing the number of active components which may fail, and facilitating more straightforward equalization between the optical powers of the optical signal to be protected and the optical signals which are not. Although the OSS 35 and the photonic switching fabric 50 are set to redirect only the protected single channel optical signal through the switched redundant output 58 of the photonic switching fabric 50, use of the tunable optical filter 27 advantageously insures against unwanted optical signals being combined with the second multi-wavelength optical signal at the combiner 22. It should also be noted that an egress trunk line card 20 in an arrangement which has both ingress trunk line cards 10 and ingress tributary cards 30 can perform the functions described in association with either of the embodiments described in association with FIGS. 1 and 2 depending upon the particular failure. In general it is to be understood that any of the egress cards according to the invention may be used in any one of the contexts illustrated herein within a protection switching arrangement as the need dictates.

As with the embodiment described in association with FIG. 1, the egress trunk line card 20 multiplexes the optical signals received from the switched in-service output ports 56 of the photonic switching fabric 50 and combines them in combiner 22 with the filtered protected single channel optical signal $\lambda_v$ into a combined multi-wavelength optical signal to be output along egress optical fiber 21.

As with the embodiment described in association with FIG. 1, the arrangement of FIG. 2 may be adapted to perform as an N+x (x>1) protection scheme. In such a case, more than one optical signal may be protected by the provision of more protection OSS output ports on the OSS, additional redundant optical pathways, more filters, and more combiners (or more input ports on the combiner). For example in an N+2 protection scheme, the OSS would have two protection OSS output ports. In such a case, each output port of the OSS 35 would be for redirecting, in the case of two failures in the switching fabric, the two optical signals to be protected which would be directed through a respective redundant optical pathway through a respective tunable filter which would filter out all erroneous optical signals except for the respective optical signals to be protected.

Figure 3:
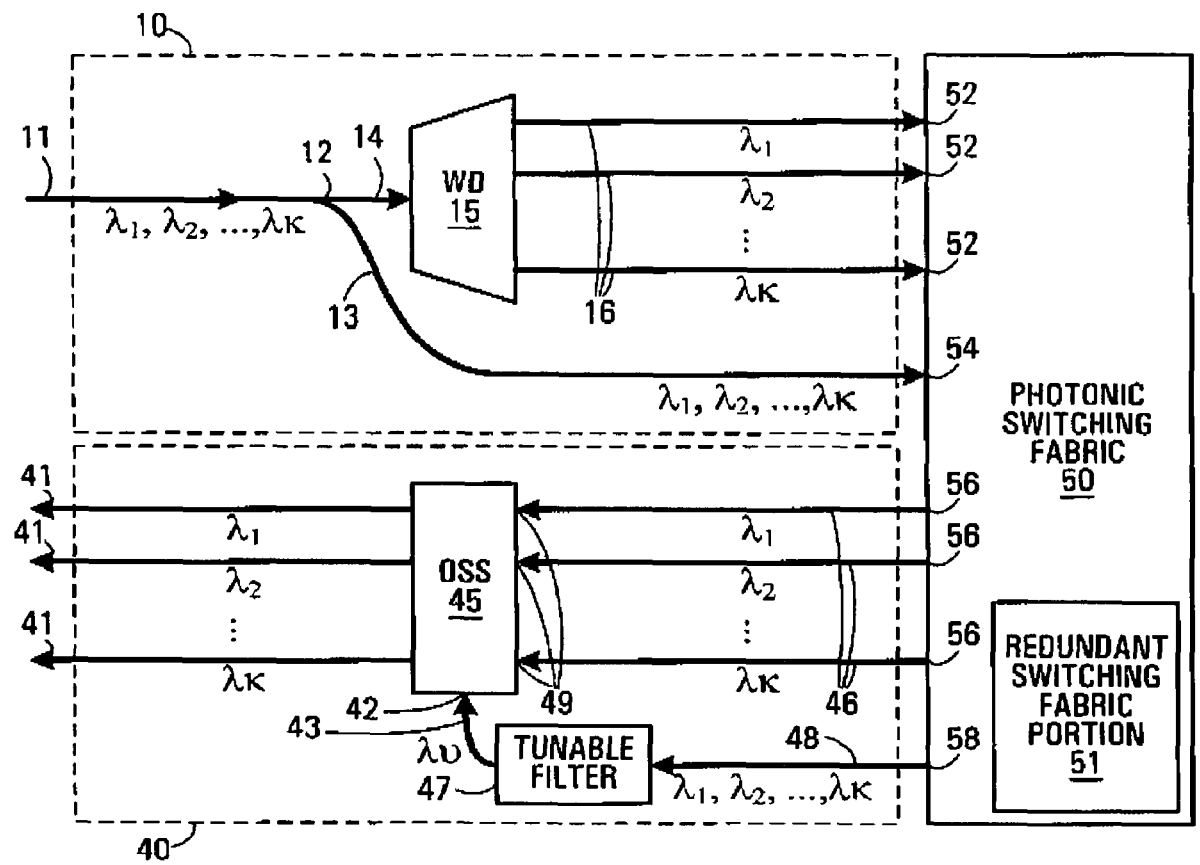
FIG. 3 is a schematic block diagram of protection switching according to a trunk card to tributary card embodiment of the invention.

Referring to FIG. 3, a protection switching arrangement according to a trunk card to tributary card embodiment of the invention is described. An ingress trunk line card 10 is coupled to the ingress side of a photonic switching fabric 50 which in turn is coupled on its egress side to an egress tributary card 40. The embodiment depicted in FIG. 3 utilizes a splitter, a tunable optical filter, and an optical selector switch to perform signal redirection when switching fabric failure occurs.

The embodiment of FIG. 3 will first be described in terms of its structure. The structure and interconnection of the ingress trunk line card 10 and the photonic switching fabric 50 of FIG. 3 are the same as the structure and interconnection of respectively the ingress trunk line card 10 and the photonic switching fabric 50 of FIG. 1.

As described in association with FIG. 1, switching is typically performed between one or more ingress cards and one or more egress cards, and accordingly the egress tributary card 40 of FIG. 3 is only one of possibly more than one egress card.

Switched in-service outputs 56 of the photonic switching fabric 50 are optically coupled by a plurality of ingress in-service optical waveguides 46 of the egress tributary card 40 to a plurality of respective in-service OSS input ports 49 of an optical selector switch (OSS) 45. A plurality of output ports of the OSS 45 are coupled through a plurality of outputs of the egress tributary card 40 to respective egress optical fibers 41. The switched redundant output 58 of the photonic switching fabric 50 is coupled by a switched protection optical waveguide 48 to an input of a tunable optical filter 47. An output of the tunable optical filter 47 is coupled by a post-filter optical waveguide 47 to a protection OSS input port 42 of the OSS 45.

The embodiment of FIG. 3 will now be described in terms of its function. In a similar manner to that of the embodiment of FIG. 1, the ingress trunk line card 10 and the egress tributary card 40 of FIG. 3 are adapted to perform protection switching in cooperation with the photonic switching fabric 50 which performs switching of in-service optical signals, and in the event of failure, performs redundant path switching for protected optical signals. As with the embodiment described in association with FIG. 1, the arrangement may operate in a service or a protection mode.

During operation in either mode, the ingress trunk line card 10 and the photonic switching fabric 50 function the same as the ingress trunk line card 10 and the photonic switching fabric 50 function in the embodiment of FIG. 1.

The photonic switching fabric 50 switches each of the single channel optical signals $\lambda_1, \lambda_2, \ldots, \lambda_K$ to a respective appropriate switched in-service output 56 to propagate along egress in-service optical waveguides 46 as switched in-service optical signals. As is the case for the other embodiments, the switched in-service optical signals traversing the egress in-service optical waveguides 46 of any particular egress card may originate from different multi-wavelength optical signals and hence different ingress cards. The switched in-service optical signals then enter the in-service OSS input ports 49 of the OSS 45. The OSS 45 is arranged so that when it is in service mode it switches each single channel optical signal $\lambda_1, \lambda_2, \ldots \lambda_K$ to one of its output ports, and in a preferred embodiment the OSS 45 is arranged to allow the single channel optical signals $\lambda_1, \lambda_2, \ldots, \lambda_K$ to pass straight through the OSS 45 and out of its output ports without any optical switching.

The protection portion of the multi-wavelength optical signal traverses the redundant portion of the photonic switching fabric 50, and is switched to an appropriate switched redundant output 58 of the photonic switching fabric 50. In the absence of a failure the protection portion of the multi-wavelength optical signal may be rerouted to any egress card where it is filtered out completely by a tunable filter 47, or alternatively it may simply be dropped until a failure has been detected and protection mode is commenced.

While the protection switching arrangement is in service mode, the tunable optical filter 47 is tuned so that no optical signal of the protection portion of the multi-wavelength optical signal emerges at its output along the post-filter optical waveguide 43. Alternatively, as noted above, the protection switching arrangement may utilize the photonic switching fabric 50 itself to redirect a multi-wavelength optical signal input over a redundant input 54 to a dropped output (not shown) of the photonic switching fabric 50.

During protection mode of operation after a failure has been detected in, for example, the in-service switching portion of the photonic switching fabric 50, the protection portion of the multi-wavelength optical signal which contains the protected single channel optical signal $\lambda_v$ is switched to the egress tributary card 40 to which the in-service portion of the protected single channel optical signal $\lambda_v$ would have been switched if there were no failure. This optical signal is switched through the switched redundant output 58 of the photonic switching fabric 50 along the switched protection optical waveguide 48 to the tunable optical filter 47. Since all of the optical signals in the multi-wavelength optical signal except for $\lambda_v$ are invalid and would interfere with the correct optical signals of similar respective wavelengths traversing the egress in-service optical waveguides 46 if they were ever multiplexed together, the tunable optical filter 47 is tuned so that no optical signal emerges at its output except for the single channel optical signal $\lambda_v$. The filter 47 is also such that it absorbs all other optical signals to avoid back reflection in the optical system.

Whether the failure originates from a faulty switching element, a problem with the optical path, or any other problem in the in-service portion of the photonic switching fabric 50, typically the protected single channel optical signal $\lambda_v$ does not emerge from any of the in-service outputs 56 of the photonic switching fabric 50.

The single channel optical signal $\lambda_v$ emerges from the output of the tunable optical filter 47 and propagates along the post-filter optical waveguide 43 to the protection OSS input port 42 of the optical selector switch 45 where it is switched to one of its outputs. Advantageously the output of the OSS 45 over which the protected single channel optical signal $\lambda_v$ is output is the very same output that the protected single channel optical signal $\lambda_v$ would have been output over had there been no failure. The output being the output to which the optical signal $\lambda_v$ would have been switched had it been output from one of the switched in-service outputs 56 of the photonic switching fabric 50.

The in-service portions of the single channel optical signals $\lambda_1, \lambda_2, \ldots, \lambda_K$ except for $\lambda_v$, along with the protection portion of the protected single channel optical signal $\lambda_v$, are output through the outputs of the egress tributary card 40 over egress optical fibers 41.

This embodiment illustrates how optical signal redirection can occur without the use of optical switches on the ingress side to perform protection switching. The utilization of a splitter and OSS plus tunable filter design simplifies the protection architecture for optical protection of a photonic cross-connect system. The design also may provide a cost advantage by avoiding the use of a costly selector switch on the ingress side. Avoiding the use of the switch also may improve reliability by reducing the number of active components which may fail, and facilitating more straightforward equalization between the optical powers of the optical signal to be protected and the optical signals which are not.

As with the embodiment described in association with FIGS. 1 and 2, the arrangement of FIG. 3 may be adapted to perform as an N+x (x>1) protection scheme. In such a case, more than one optical signal may be protected by the provision of more splitters (or more splitter output ports), additional redundant optical pathways, more filters, and more protection OSS input ports on the OSS. For example in an N+2 protection scheme, a 1×3 splitter instead of the 1×2 splitter could be employed. In such a case, two of the outputs of the splitter would be protection outputs for redirecting a portion of all of the signals through a separate redundant optical pathway. In the case of two failures in the switching fabric, the two optical signals to be protected would be directed through a respective redundant optical pathway through a respective tunable filter which would filter out all optical signals except for the respective optical signals to be protected. Each of the two respective optical signals would then be input over a respective protection OSS input port of the OSS 45 to be switched and output over respective egress optical fibers 41.

Figure 4:
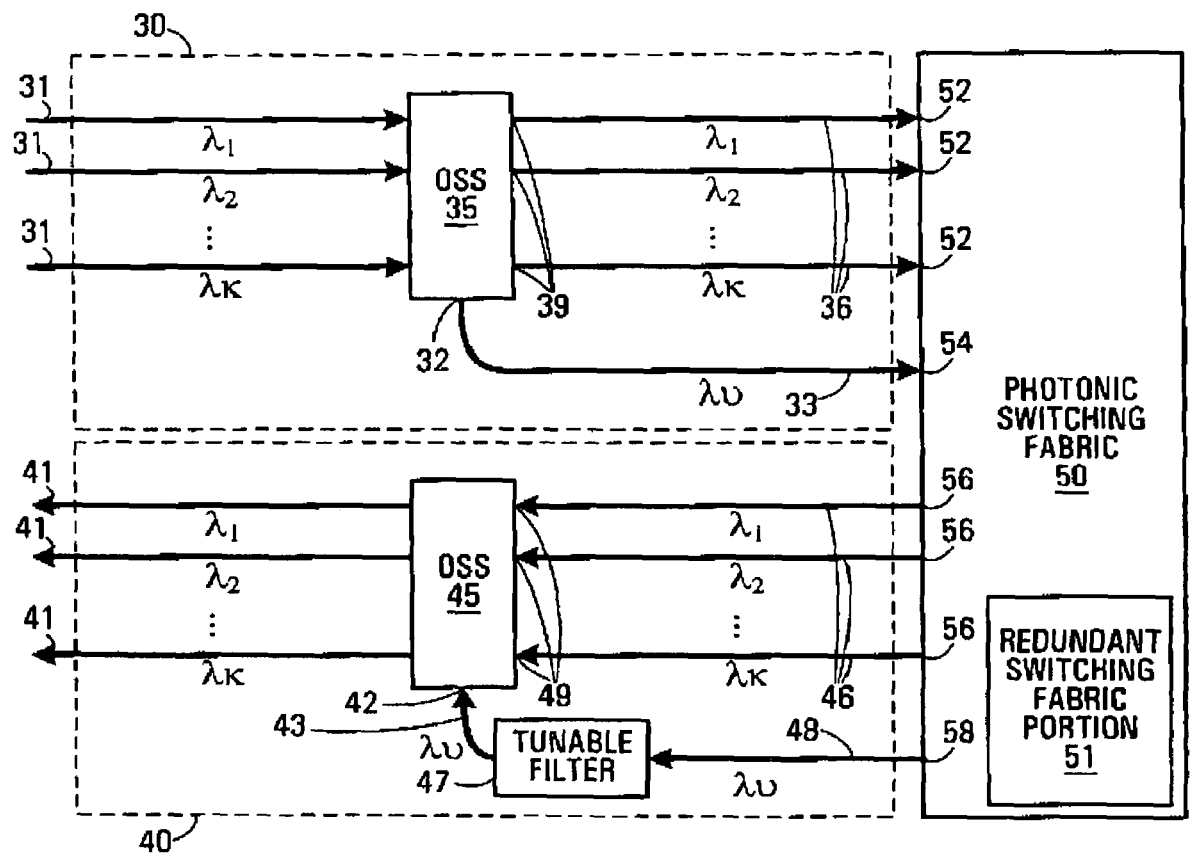
FIG. 4 is a schematic block diagram of protection switching according to a tributary card to tributary card embodiment of the invention.

Referring to FIG. 4, a protection switching arrangement according to a tributary card to tributary card embodiment of the invention is described. An ingress tributary card 30 is coupled to the ingress side of a photonic switching fabric 50 which in turn is coupled on its egress side to an egress tributary card 40. The embodiment depicted in FIG. 4 utilizes two optical selector switches and a tunable optical filter to perform signal redirection when switching fabric failure occurs.

The embodiment of FIG. 4 will first be described in terms of its structure. The structure of the photonic switching fabric 50 of FIG. 4 is the same as the structure of the photonic switching fabric 50 of FIG. 1. The structure of the ingress tributary card 30 and its interconnection with the photonic switching fabric 50 of FIG. 4 are the same as the structure of the ingress tributary card 30 and its interconnection with the photonic switching fabric 50 of FIG. 2. The structure of the egress tributary card 40 and its interconnection with the photonic switching fabric 50 of FIG. 4 are the same as the structure of the egress tributary card 40 and its interconnection with the photonic switching fabric 50 of FIG. 3.

As described in association with FIG. 1, switching is typically performed between one or more ingress cards and one or more egress cards, and accordingly the ingress tributary card 30 of FIG. 4 is only one of possibly more than one ingress card.

The embodiment of FIG. 4 will now be described in terms of its function. In a similar manner to that of the embodiment of FIG. 1, the ingress tributary card 30 and the egress tributary card 40 of FIG. 4 are adapted to perform protection switching in cooperation with the photonic switching fabric 50 which performs switching of in-service optical signals, and in the event of failure, performs redundant path switching for protected optical signals. As with the embodiment described in association with FIG. 1, the arrangement may operate in a service or a protection mode.

During operation in either mode, the ingress tributary card 30 and the photonic switching fabric 50 function the same as the ingress tributary card 30 and the photonic switching fabric 50 function in the embodiment of FIG. 2.

The photonic switching fabric 50 switches each of the single channel optical signals $\lambda_1, \lambda_2, \ldots, \lambda_K$ to a respective appropriate switched in-service output 56 to propagate along egress in-service optical waveguides 46 as switched in-service optical signals. As is the case for the other embodiments, the switched in-service optical signals traversing the egress in-service optical waveguides 46 of any particular egress card may originate from different ingress cards. The switched in-service optical signals then enter the in-service OSS input ports 49 of the OSS 45. The OSS 45 is arranged so that when it is in service mode it switches each single channel optical signal $\lambda_1, \lambda_2, \ldots, \lambda_K$ to one of its output ports, and in a preferred embodiment the OSS 45 is arranged to allow the single channel optical signals $\lambda_1, \lambda_2, \ldots, \lambda_K$ to pass straight through the OSS 45 and out of its output ports without any optical switching.

The protected single channel optical signal $\lambda_v$ traverses the redundant portion of the photonic switching fabric 50, and is switched to an appropriate switched redundant output 58 of the photonic switching fabric 50 to traverse the switched protection optical waveguide 48 to the tunable optical filter 47.

During operation in service mode, the tunable optical filter 47 is tuned so that no optical signal emerges at its output even if one were erroneously input along the switched protection optical waveguide 48. As such the tunable optical filter provides an extra layer of protection for the optical communication system from stray optical signals due to a problem in the protection arrangement itself. Alternatively, the protection switching arrangement may utilize the photonic switching fabric 50 itself to redirect an erroneous optical signal to a dropped output (not shown) of the photonic switching fabric 50.

During operation in protection mode, the tunable optical filter 47 is tuned so that no optical signal emerges at its output except for the protected single channel optical signal $\lambda_v$. The filter 47 is also such that it absorbs all other optical signals to avoid back reflection of erroneous signals in the optical system.

Since the protected single channel optical signal $\lambda_v$ is switched by the OSS 35 of the ingress tributary card 10 upon failure in the photonic switching fabric 50, the protected single channel optical signal $\lambda_v$ does not emerge from any of the in-service outputs 56 of the photonic switching fabric 50.

The protected single channel optical signal $\lambda_v$ emerges from the output of the tunable optical filter 47 and propagates along the post-filter optical waveguide 43 to the protection OSS input port 42 of the optical selector switch 45 where it is switched to one of its outputs. Advantageously the output of the OSS 45 over which the protected single channel optical signal $\lambda_v$ is output is the very same output that the protected single channel optical signal $\lambda_v$ would have been output over if there had been no failure. The output being the output to which the optical signal $\lambda_v$ would have been switched had it been output from one of the switched in-service outputs 56 of the photonic switching fabric 50.

The in-service portions of the single channel optical signals $\lambda_1, \lambda_2, \ldots, \lambda_K$ except for $\lambda_v$, along with the protected single channel optical signal $\lambda_v$, are output through the outputs of the egress tributary card 40 over egress optical fibers 41.

Although the OSS 35 and the photonic switching fabric 50 are set to redirect only the protected single channel optical signal through the switched redundant output 58 of the photonic switching fabric 50, use of the tunable optical filter 47 advantageously insures against unwanted optical signals being output to the egress optical fiber after undergoing protection switching. Of course since the protection switching arrangement depicted may comprise other ingress cards, the tunable optical filter 47, may be used, if needed, to obtain a protected optical signal from a multi-channel optical signal redirected by some other ingress card.

As with the embodiment described in association with FIG. 1, the arrangement of FIG. 4 may be adapted to perform as an N+x (x>1) protection arrangement. In such a case, more than one optical signal may be protected by the provision of more protection OSS output ports on the OSS 35, additional redundant optical pathways, more filters, and more protection OSS input ports on the OSS 45. For example in an N+2 protection scheme, the OSS 35 would have two protection OSS output ports. In such a case, each output port of the OSS 35 would be for redirecting, in the case of two failures in the switching fabric, the two optical signals to be protected which would be directed through a respective redundant optical pathway through a respective tunable filter which would filter out all erroneous optical signals except for the respective optical signals to be protected, after which the two protected optical signals would enter respective protection OSS input ports on the OSS 45, to be switched by the OSS 45 and out egress optical fibers 41.

This embodiment illustrates that in a system which utilizes optical switches for optical signal redirection, the provision of an optical tunable filter 47 can act as an extra layer of protection against problems with the protection switching arrangement itself, and can serve also as a back-up to which a multi-wavelength optical signal including the protected single channel optical signal may be rerouted.

Figure 5:
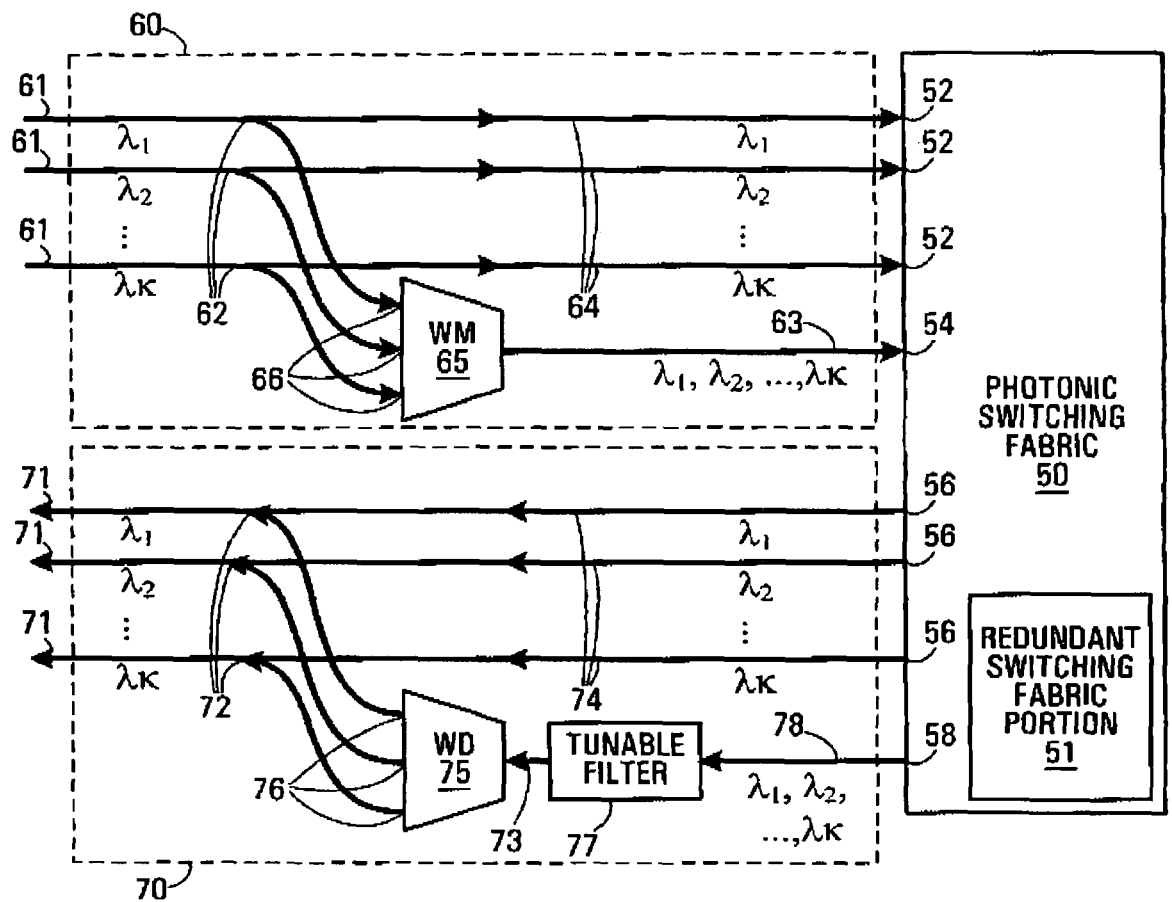
FIG. 5 is a schematic block diagram of protection switching according to a tributary card to tributary card embodiment of the invention utilizing multiplexing and demultiplexing.

Referring to FIG. 5, a protection switching arrangement according to a tributary card to tributary card embodiment of the invention utilizing multiplexing and demultiplexing is described. An ingress tributary card 60 is coupled to the ingress side of a photonic switching fabric 50 which in turn is coupled on its egress side to an egress tributary card 70. The embodiment depicted in FIG. 1 utilizes a number of splitters, a multiplexer, a tunable optical filter, a demultiplexer, and a number of combiners to perform signal redirection when switching fabric failure occurs, rather than utilizing optical switches.

The embodiment of FIG. 5 will first be described in terms of its structure. A plurality of inputs of the ingress tributary card 60 are coupled to a respective plurality of ingress optical fibers 61. Optically coupled to each input of the ingress tributary card 60 is an input port of an optical splitter 62. An in-service output port of each optical splitter 62 is coupled by a respective ingress in-service waveguide 64 to a respective in-service input 52 of the photonic switching fabric 50. A protection output port of each optical splitter 62 is optically coupled by a respective pre-multiplexer waveguide to an input 66 of a wavelength multiplexer (WM) 65. An output of the WM 65 is coupled by a protection optical waveguide 63 to the redundant input 54 of the photonic switching fabric 50.

The photonic switching fabric 50 of FIG. 5 is structured the same as the photonic switching fabric 50 of FIG. 1.

Each switched in-service output 56 of the photonic switching fabric 50 is coupled by a respective egress in-service waveguide 74 to a respective in-service input port of a respective optical combiner 72. The switched redundant output 58 of the photonic switching fabric 50 is coupled by a switched protection optical waveguide 78 to an input of a tunable optical filter 77. An output of the tunable optical filter 77 is coupled by a post-filter optical waveguide 73 to an input of a wavelength demultiplexer (WD) 75. Each one of a plurality of outputs 76 of the WD 75 is coupled by a respective post-demultiplexer waveguide to a respective protection input port of a respective optical combiner 72. An output of each optical combiner 72 is coupled through the output of the egress tributary card 70 to a respective egress optical fiber 71.

As noted above switching typically is performed between one or more ingress cards and one or more egress cards. As such in FIG. 5, the ingress tributary card 60 is to be understood as being one of possibly more than one ingress card, and the egress tributary card 70 is to be understood as being one of possibly more than one egress card. As with the other embodiments, it is to be understood that multiple in-service inputs 52, redundant inputs 54, switched in-service outputs 56, and switched redundant outputs 58 are provided on the photonic switching fabric 50 to service multiple ingress and egress cards. As with the other embodiments, in an optical cross-connect arrangement, single channel optical signals input over one ingress card can be output over different egress cards, and in general the single channel optical signals entering any single card do not need to stay together, and are switched in the switching fabric more or less independently.

The embodiment of FIG. 5 will now be described in terms of its function. The ingress tributary card 60 and the egress tributary card 70 are adapted to perform protection switching in cooperation with the photonic switching fabric 50 which performs switching of in-service optical signals, and in the event of failure, redundant path switching for protected optical signals. As with the protection switching arrangement of FIG. 1, the arrangement depicted in FIG. 5 may operate in either a service mode or a protection mode.

During operation in either mode, the ingress tributary card 60 is input with a plurality of single channel optical signals $\lambda_1$, $\lambda_2$, ..., $\lambda_K$ propagating along the plurality of ingress optical fibers 61. Typically these single channel optical signals are individual signals having wavelengths corresponding to wavelengths of a WDM aggregate.

Each splitter 62 shown in FIG. 5 is a power splitter, outputting an in-service portion of the optical signal entering its input port through its in-service output port along a respective ingress optical waveguide 64, and outputting a protection portion of the optical signal through its protection output port along a respective pre-multiplexer waveguide. The splitting ratio for each splitter between the power of the in-service portion of the optical signal and the protection portion of the optical signal may be set in accordance the optical properties of the arrangement and in particular, may be chosen to compensate for losses through the photonic switching fabric 50 and the tunable optical filter 77, and the combining ratios of the optical combiners 72 in order to obtain desired behavior of the optical signals traversing the arrangement.

The optical splitters can be arranged so that each of the single channel optical signals $\lambda_1, \lambda_2, ..., \lambda_K$) entering an input port of a respective splitter is split according to the same splitting ratio between the in-service output port and the protection output port.

The in-service portion of each single channel optical signal traverses a respective ingress in-service optical waveguide 64 to a respective in-service input 52 of the photonic switching fabric 50.

The protection portion of each single channel optical signal traverses a respective pre-multiplexer waveguide to an input 66 of the WM 65. The WM 65 multiplexes the single channel optical signals into a multi-wavelength optical signal comprising the single channel optical signals $\lambda_1, \lambda_2, ..., \lambda_K$, and outputs it along protection optical waveguide 63. The multi-wavelength optical signal is then input to the redundant input 54 of the photonic switching fabric 50.

The photonic switching fabric 50 functions in the same manner as the photonic switching fabric 50 of FIGS. 1, and 3, switching the single channel optical signals as appropriate through the in-service switching fabric portion to the switched in-service outputs 56, and switching the multi-wavelength optical signal through the protection switching fabric portion to the switched protection output 58.

Each of the single channel optical signals $\lambda_1, \lambda_2, \ldots, \lambda_K$ switched to a respective appropriate switched in-service output 56 propagates along an egress in-service optical waveguide 74 as a switched in-service optical signal. As outlined above, the switched in-service optical signals traversing the egress in-service optical waveguides 74 of any particular egress card may originate from different ingress cards.

Each switched in-service optical signal is output through a respective optical combiner 72, through the output of the egress tributary card 70, and out along the egress optical fiber 71.

The multi-wavelength optical signal comprising the protection portions of the single channel optical signals $\lambda_1, \lambda_2, \ldots, \lambda_K$, in the absence of a failure, may be rerouted to any egress card where it is filtered out completely by a tunable filter 77, or alternatively it may simply be dropped until a failure has been detected and protection mode is commenced.

While the protection switching arrangement is in service mode, the tunable optical filter 77 is tuned so that no optical signal emerges at its output along the post-filter optical waveguide 73. Alternatively, as noted above, the protection switching arrangement may utilize the photonic switching fabric 50 itself to redirect the multi-wavelength optical signal input over a redundant input 54 to a dropped output (not shown) of the photonic switching fabric 50.

As described in connection with the embodiment of FIG. 1 the arrangement of FIG. 5 operates in protection mode after a failure in the in-service portion of the photonic switching fabric 50. A protected single channel optical signal $\lambda_v$ which would be affected by the failure is rerouted around the failure. It is to be understood that the egress tributary card 70 depicted in FIG. 4 is precisely the egress tributary card 70 to which the in-service portion of the protected single channel optical signal $\lambda_v$ would have been switched if there were no failure.

In protection mode, the multi-wavelength optical signal containing the protected single channel optical signal $\lambda_v$ is switched through the respective switched redundant output 58 of the photonic switching fabric 50 to the egress tributary card 70.

The multi-wavelength optical signal containing the protected single channel optical signal $\lambda_v$ after emerging from the switched redundant output 58 then propagates along the switched protection optical waveguide 78 to the input of the tunable optical filter 77. Since all of the optical signals in the multi-wavelength optical signal except for $\lambda_v$ are invalid and would interfere with the correct optical signals of similar respective wavelengths traversing the egress in-service optical waveguides 74, the tunable optical filter 77 is tuned so that no optical signal emerges at its output except for the protected single channel optical signal $\lambda_v$. The filter 77 is also such that it absorbs all other optical signals to avoid back reflection in the optical system.

In protection mode, each of the in-service portions of the single channel optical signals $(\lambda_1, \lambda_2, \ldots, \lambda_K$ except for $\lambda_v)$ which have been switched by the in-service switching portion of the photonic switching fabric 50 to the egress tributary card 70 of FIG. 5 emerge through switched in-service outputs 56 in the same manner as when the arrangement is in service mode. The single channel optical signals propagate along egress in-service optical waveguides 74 and enter respective in-service input ports of respective optical combiners 72.

The single channel optical signal $\lambda_v$ emerges from the output of the tunable optical filter 77 and propagates along the post-filter optical waveguide 73 to an input of the WD 75. The WD 75 then performs demultiplexing upon the protected single channel optical signal $\lambda_v$. The WD 75 in performing its demultiplexing function redirects the single channel optical signal $\lambda_v$ out through one of its outputs along a respective post-demultiplexer optical waveguide to a protection input port of a respective optical combiner 72. The particular output through which the protected single channel optical signal $\lambda_v$ is output is a function of its wavelength. Advantageously, the particular optical combiner 72 whose protection input port is input with the protected single channel optical signal $\lambda_v$ from the WD, is the very same optical combiner 72 whose in-service input port would have been inputted with the in-service single channel optical signal $\lambda_v$ had there been no failure. From the above, it is clear that each optical combiner 72 in FIG. 5 receives only one single channel optical signal over either its in-service input port or over its protection input port. As such each of the optical combiners 72 outputs a single channel optical signal through its output port to exit an output of the egress tributary card 70 and out along an egress fiber 71.

The combining ratio in the combined output between the power of the optical signals entering the in-service input port and the protection input port may be set in accordance with the optical properties of the arrangement and in particular, may be chosen to compensate for the losses through the photonic switching fabric 50 and the tunable optical filter 77, and the splitting ratios of the optical splitters 62 in order to obtain desired behavior of the optical signals traversing the arrangement.

The embodiment illustrates the redirection of a plurality of single channel optical signals without the use of optical switches to perform protection switching. The utilization of a series of splitters and combiners, a multiplexer and demultiplexer, plus a tunable filter simplifies the protection architecture for optical protection of a photonic cross-connect system. The design also provides a cost advantage by avoiding the use of a costly selector switch. Avoiding the use of switches also may improve reliability by reducing the number of active components which may fail, and facilitating more straightforward equalization between the optical powers of the optical signal to be protected and the optical signals which are not.

As was the case with embodiment of FIG. 1, optical power through the arrangement is inevitably lost, and the total optical power of a single channel optical signal output along an egress optical fiber 71 will not be as great as the power of the original single channel optical signal.

It should be noted that although the embodiment has been depicted in the context of an N+1 protection scheme, in an N+x (x>1) scheme, more than one optical signal may be protected by the provision of more splitters (or a splitter with more output ports), additional multiplexers, additional redundant optical pathways, more filters, additional demultiplexers, and more combiners (or a combiner with more input ports). For example in an N+2 protection scheme, a series of 1×3 splitters instead of the 1×2 splitters could be employed. In such a case, two of the outputs of each splitter would be protection outputs for redirecting a portion of each of the signals through a separate WM for multiplexing into a separate redundant optical pathway. In the case of two failures in the switching fabric, the two optical signals to be protected would be multiplexed and directed through a respective redundant optical pathway through a respective tunable filter which would filter out all optical signals except for the respective optical signal to be protected. Each of the two respective optical signals would then be demultiplexed and redirected to a respective input port of a 3×1 combiner to be redirected over an egress optical fiber 71.

Figure 6:
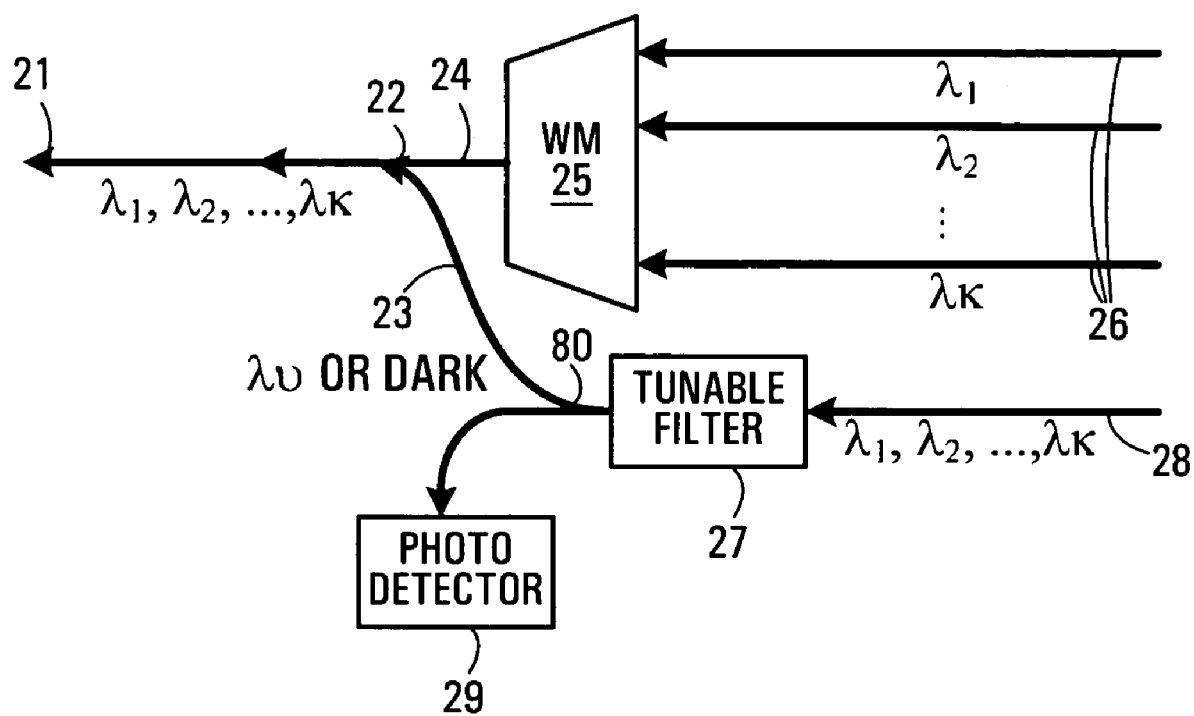
FIG. 6 is a schematic block diagram of an embodiment of the invention utilizing filter center frequency optimization.

Referring to FIG. 6, an embodiment of the invention utilizing filter center frequency optimization is described. Although in this embodiment the center frequency optimization is carried out on the tunable optical filter 27 which was described in association with the embodiment of FIG. 1, it may be carried out on any of the tunable optical filters of any of the embodiments described herein. Center frequency optimization is achieved through the use of a tap and a photodetector to determine if the tunable optical filter is optimally set.

The embodiment of FIG. 6 will first be described in terms of its structure. An input port of an optical power tap 80 is coupled along the post-filter optical waveguide 23 such that optical signals emerging from the tunable optical filter 27 are input into the input port of the optical power tap 80. A tapped power output port of the optical power tap 80 is coupled to an input of a photodetector 29. Not shown is a control loop coupled to electrical outputs of the photodetector 29 and electrical control inputs of the tunable optical filter 27 which would be coupled to a switching controller.

The embodiment of FIG. 6 will now be described in terms of its function. A tap portion (typically<10%) of the optical power of the protected single channel optical signal $\lambda_v$ which is output from the tunable optical filter 27 enters the input port of the optical power tap 80 and is directed out of the output port of the optical power tap 80 to the input of a photodetector 29. The photodetector 29 provides through an electrical output, information about the optical power of the tap portion and hence a measure of the optical power of the protected single channel optical signal $\lambda_v$. Through the use of a switching controller or similar element which monitors the electrical output of the photodetector 29, the tunable optical filter 27 is controlled to allow the greatest optical power of the wavelength band of the protected single channel optical signal to pass through it. This is desirable since when the power out of the filter is a maximum, the filter centering on the protected single channel optical signal is optimum. In this way, after a tunable optical filter 27 has been set to allow a particular protected single channel optical signal to pass through it, the center frequency of the filter is further optimized to allow maximum power transmission. The photodetector 29 may also be used to verify that no optical signals are being output by the tunable optical filter 27 when the arrangement operates in service mode, and may be used to assist in the tuning of the tunable optical filter 27 to achieve this.

Although the tunable optical filter of each of the embodiments has been shown as being present on the egress card, between the post-filter optical waveguide and the switched protection optical waveguide, the invention equally contemplates arrangements in which the tunable optical filter is present on the ingress card, situated along the protection waveguide. In such a case, the only difference is that instead of filtering occurring just past redirection through the redundant switching fabric in the photonic switching fabric 50, filtering occurs just before said redirection.

Referring to FIG. 7, an embodiment utilizing a protective optical blocker is described. When a failure occurs in a switching element or optical path in the in-service switching portion of the photonic switching fabric 50, the protection portion of the single channel optical signal $\lambda_v$ is rerouted to the egress card it should have been switched to by the photonic switching fabric 50. Each of the embodiments described hereinbefore discusses how a protection portion of the optical signal $\lambda_v$ is provided to the proper waveguide on the proper egress card. In any embodiment, and particularly those depicted in FIGS. 1, 3, and 5, a failure may cause, in addition to the absence of an optical signal at the egress card over which it should traverse, the presence of an optical signal over an incorrect waveguide of an egress card or at an egress card over which it should not traverse. This may occur, if for example, the incorrect MEMS element of the switching fabric, such as a mirror, is in an active state and is unresponsive to command signals which normally cause it to become inactive, causing the optical signal to be output along the incorrect switched in-service output 56.

The embodiment of FIG. 7 will first be described in terms of its structure. The ingress trunk line card 10 of FIG. 7 is structured and functions the same as ingress trunk line card 10 described in association with FIG. 1. It should be understood that the ingress card shown is the ingress card from which a stray optical signal has originated. The photonic switching fabric 50 is structured the same as photonic switching fabric 50 described in association with FIG. 1. The egress trunk line card 20 is structured the same as the egress trunk line card 20 described in association with FIG. 1 except for an optical blocker 99 being situated along an egress in-service waveguide 26 of the egress trunk line card 20 of FIG. 7. The optical blocker 99 could be an optical shutter which may be for example a MEMS shutter comprising an extendible and retractable opaque shutter. The blocker 99 alternatively could be a variable optical attenuator (VOA) with a high extinction ratio, a tunable optical filter, or any other suitable optical element which may be controllably set to allow optical signals to pass therethrough or to prevent optical signals from passing therethrough. Although only one optical blocker 99 is depicted, it should be understood that any number of egress in-service waveguides 26 could have optical blockers 99 there situated, and in an exemplary embodiment optical blockers 99 would be present on all egress in-service waveguides 26.

The embodiment of FIG. 7 will now be discussed in terms of its function. In this embodiment, the photonic switching fabric is in a condition of failure such that a single channel stray optical signal $\lambda'_o$ of a plurality of single channel optical signals $A'_1, A'_2, \ldots \lambda'_K$ is mistakenly switched to egress trunk line card 20. The stray optical signal $\lambda'_o$ may be switched to an entirely incorrect egress card, or may be switched over an incorrect switched in-service output 56 of the photonic switching fabric 50. The failure within the photonic switching fabric 50 may be due to an unresponsive MEMS switching element being in an active state. The stray optical signal $\lambda'_o$ emerges through one of the switched in-service outputs 56 of the photonic switch fabric 50, and along one of the egress in-service waveguides 26 of the egress trunk line card 20. In order to avoid contamination of the network downstream from the egress trunk line card 20, the stray optical signal $\lambda_o$ is controllably prevented with use of the optical blocker 99 from traversing the egress in-service waveguide 26 to the wavelength multiplexer 25.

The optical signal which should have emerged from the particular switched in-service output 56, namely $\lambda_v$ (which in this case is $\lambda_2$) is either split or redirected in the relevant ingress card (not shown) so that it traverses a protection path through the photonic switching fabric 50 and emerges over switched redundant output 58 and is obtained with use of the tunable optical filter 27 as is described in association with embodiments hereinabove. Although not shown, since the stray optical signal $\lambda_o$ has been misdirected, one of the egress cards (not shown) coupled to the photonic switching fabric 50 will not receive over an egress in-service output 56 the optical signal $\lambda_o$ which should have been switched there. Instead, the protection portion of the multi-wavelength optical signal ($\lambda'_1$, $\lambda'_2, \ldots \lambda'_K$) traversing the protection optical waveguide 13 is redirected through the protection portion of the photonic switching fabric 50 to the switched protection optical waveguide of the egress card (not shown) the optical signal $\lambda_v$ should have been switched to in the first place.

This embodiment illustrates how use of optical blockers may be combined with redirection and filtering of optical signals to effect a protection switching arrangement which deals with both erroneously missing optical signals and erroneously present optical signals due to a failure.

Although each of the embodiments described thus far have been in the context of protection switching, the invention contemplates embodiments which implement generally a method and protection switching arrangement for redirecting an optical signal which is part of a multi-wavelength optical signal and a method and protection switching arrangement for redirecting an optical signal which is one of a plurality of optical signals. In the case of redirecting an optical signal which is part of a multi-wavelength optical signal, the redirection of the optical signal is facilitated by redirection of the multi-wavelength optical signal and the subsequent wavelength filtering of the multi-wavelength optical signal to obtain the optical signal. In the case of redirecting an optical signal which is one of a plurality of optical signals, the plurality of optical signals are first multiplexed into a multi-wavelength optical signal which is then redirected and by the subsequent wavelength filtering of the multi-wavelength optical signal the optical signal is obtained.

Numerous modifications and variations of the present invention are possible in light of the above teachings. It is therefore to be understood that within the scope of the appended claims, the invention may be practised otherwise than as specifically described herein.

We claim:

1. A method of protecting any one of a plurality of optical signals of a multi-wavelength optical signal from failure of a photonic switching fabric, the method comprising:
   optically splitting the multi-wavelength optical signal to obtain a protection portion of the multi-wavelength optical signal comprising protection portions of each of the optical signals;
   detecting a failure in the photonic switching fabric which would affect a particular optical signal of the plurality of optical signals;
   redirecting the protection portion of the multi-wavelength optical signal around the failure in the photonic switching fabric; and
   after the redirecting step has been completed, wavelength filtering the protection portion of the multi-wavelength optical signal to obtain the protection portion of the particular optical signal.

2. A method according to claim 1 wherein the photonic switching fabric comprises a dedicated switching fabric portion and a redundant switching fabric portion, and the step of redirecting comprises inputting the protection portion of the multi-wavelength optical signal through the redundant switching fabric portion.

3. A method according to claim 2 wherein the step of optically splitting the multi-wavelength optical signal is further to obtain am in-service potion of the multi-wavelength optical signal, the method further comprising the step of:
   directing the in-service portion of the multi-wavelength optical signal toward the dedicated switching fabric for switching therethrough.

4. A method according to claim 3 wherein the step of wavelength filtering comprises passing the protection portion of the multi-wavelength optical signal through a tunable optical filter, the method further comprising:
   optically combining the protection portion of the particular optical signal after it has passed through the tunable optical filter with a second multi-wavelength optical signal from the dedicated switching fabric portion.

5. A method according to claim 4 wherein the step of wavelength filtering further comprises:
   tapping the protection portion of the particular optical signal after it has been wavelength filtered to obtain an indication of an optical power of the protection portion of the particular optical signal; and
   tuning the tunable optical filter with use of the indication of the optical power.

6. A method according to claim 4 further comprising:
   after the step of directing the in-service portion of the multi-wavelength optical signal toward the dedicated switching fabric portion, demultiplexing the in-service multi-wavelength optical signal into a plurality of in-service optical signals;
   passing the plurality of in-service optical signals to the dedicated switching fabric portion for switching therethrough; and
   before the step of optically combining the particular optical signal with the second multi-wavelength optical signal, multiplexing a second plurality of in-service optical signals emerging from the dedicated switching fabric portion into the second multi-wavelength optical signal.

7. A method according to claim 1 wherein the failure of the photonic switching fabric is associated with a stray optical signal emerging from an output of the photonic switching fabric the particular optical signal would have emerged from had the photonic switching fabric not failed, the method further comprising:
   optically blocking the stray optical signal emerging from the output of the photonic switching fabric.

8. A protection switching arrangement for protecting any one of a plurality optical signals of a multi-wavelength optical signal from a detected failure of a photonic switching fabric, the protection switching arrangement comprising:
   an optical splitter for optically splitting the multi-wavelength optical signal to obtain a protection portion of the multi-wavelength optical signal comprising protection portions of each of the optical signals;
   redirecting means coupled to the optical splitter for redirecting the protection portion of the multi-wavelength optical signal around the detected failure of the photonic switching fabric; and
   a tunable optical filter coupled to the redirecting means for wavelength filtering the protection potion of the multi-wavelength optical signal to obtain the protection potion of any particular optical signal of the plurality of optical signals affected by the failure.

9. A protection switching arrangement according to claim 8 wherein optically splitting the multi-wavelength optical signal is further to obtain an in-service portion of the multi-wavelength optical signal, wherein the redirecting means comprising a protection optical waveguide for inputting the protection portion of the multi-wavelength optical signal through a redundant switching fabric portion, and wherein the photonic switching fabric comprises a dedicated switching fabric portion, the protection switching arrangement further comprising:
   an ingress optical waveguide for directing the in-service multi-wavelength optical signal toward the dedicated switching fabric potion for switching therethrough.

10. A protection switching arrangement according to claim 9 further comprising:
- an optical combiner coupled to an output of the tunable optical filter for optically combining the protection portion of the particular optical signal after it has passed through the tunable optical filter with a second multi-wavelength optical signal from the dedicated switching fabric portion.

11. A protection switching arrangement according to claim 10 further comprising:
- an optical tap coupled to the output of the tunable optical filter for tapping the protection portion of the particular optical signal after it has been wavelength filtered to obtain an indication of an optical power of the protection portion of the particular optical signal, said indication of the optical power for use in controllably tuning the tunable optical filter.

12. A protection switching arrangement according to claim 10, the protection switching arrangement further comprising:
- a demultiplexer coupled to the ingress optical waveguide for demultiplexing the in-service portion of the multi-wavelength optical signal into a plurality of in-service optical signals;
- a plurality of ingress in-service optical waveguides optically coupled to outputs of the demultiplexer for passing the plurality of in-service optical signals to the dedicated switching fabric portion for switching therethrough; and
- a multiplexer for multiplexing a second plurality of in-service optical signals emerging from the dedicated switching fabric into the second multi-wavelength optical signal before it is combined with the protection portion of the particular optical signal.

13. A protection switching arrangement according to claim 8 wherein the failure of the photonic switching fabric is associated with a stray optical signal emerging from an output of the photonic switching fabric the particular optical signal would have emerged from had the photonic switching fabric not failed, the protection switching arrangement further comprising:
- an optical blocker coupled to the output of the photonic switching fabric for optically blocking the stray optical signal emerging from the output of the photonic switching fabric.

14. An egress trunk line card for use in protecting any one of a plurality of optical signals of a multi-wavelength optical signal from a detected failure of a dedicated switching fabric portion of a photonic switching fabric, the egress trunk line card comprising:
- redirecting means for redirecting a protection potion of the multi-wavelength optical signal comprising protection portions of each of the optical signals around the dedicated switching fabric portion;
- a tunable optical filter coupled to the redirecting means for wavelength filtering the protection portion of the multi-wavelength optical signal to obtain the protection portion of a particular optical signal which would have been affected by the failure; and
- an optical combiner coupled to an output of the tunable optical filter for optically combining the protection potion of the particular optical signal after it has passed through the tunable optical filter with a second multi-wavelength optical signal from the dedicated switching fabric.

* * * * *